United States Patent [19]
Jackson

[11] 3,829,064
[45] Aug. 13, 1974

[54] WINCH SYSTEM

[75] Inventor: Richard L. Jackson, Lewisburg, Ohio

[73] Assignee: Jackson Communication Corporation, Clayton, Ohio

[22] Filed: Jan. 5, 1973

[21] Appl. No.: 321,210

[52] U.S. Cl........ 254/166, 214/83.24, 254/134.3 R, 254/186 R
[51] Int. Cl............................................. B66d 3/00
[58] Field of Search........ 254/166, 186 R, 143, 148, 254/134.3 R; 242/86.5, 106; 214/83.24, 85.1, 110; 108/44

[56] References Cited
UNITED STATES PATENTS

| | | | |
|---|---|---|---|
| 2,580,130 | 12/1951 | Rowdon | 242/106 |
| 2,751,193 | 6/1956 | Loomis | 254/166 |
| 2,892,556 | 6/1959 | Lowe | 214/83.24 |
| 3,070,324 | 12/1962 | Bryman | 242/86.5 R |
| 3,073,574 | 1/1963 | Garnett | 254/166 X |
| 3,726,422 | 4/1973 | Zelin | 214/83.24 |

*Primary Examiner*—Richard A. Schacher
*Assistant Examiner*—Jeffrey V. Nase
*Attorney, Agent, or Firm*—Biebel, French & Bugg

[57] ABSTRACT

A winch system for pulling or towing work as might be used in construction, rigging, communications, power or any industry using a winch. As presented here the winch system is particularly adapted for towing cables being installed on an existing messenger strand. The system includes a motor vehicle having an enclosed compartment, a stationary track assembly mounted on a floor of the vehicle within the compartment, and a movable track assembly movable along the stationary track assembly between a stowed position within the compartment and an active position disposed outside the compartment. The movable track assembly carries an indexing frame on its outer end which rotatably mounts a winch base frame. Locking means are provided for locking the movable track assembly in either its stowed or active positions and for locking the winch base frame against rotation in any of several positions. The system also includes vertically adjustable stabilizing legs pivotally mounted on the outer end of the movable track assembly and stabilizing chains which are also attached to the outer end of the movable track assembly and to some portion of the vehicle, such as the bumper thereof.

10 Claims, 18 Drawing Figures

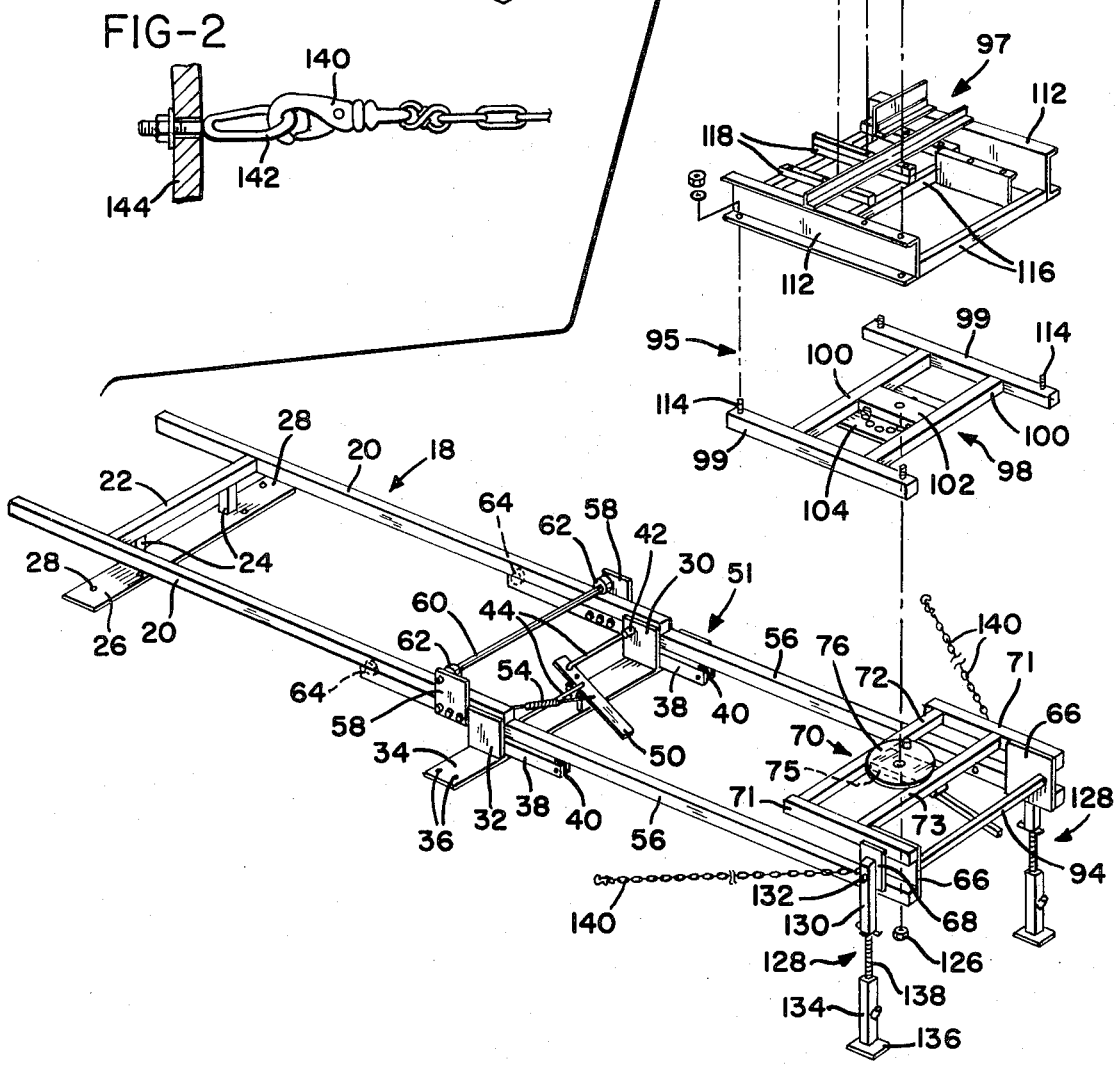

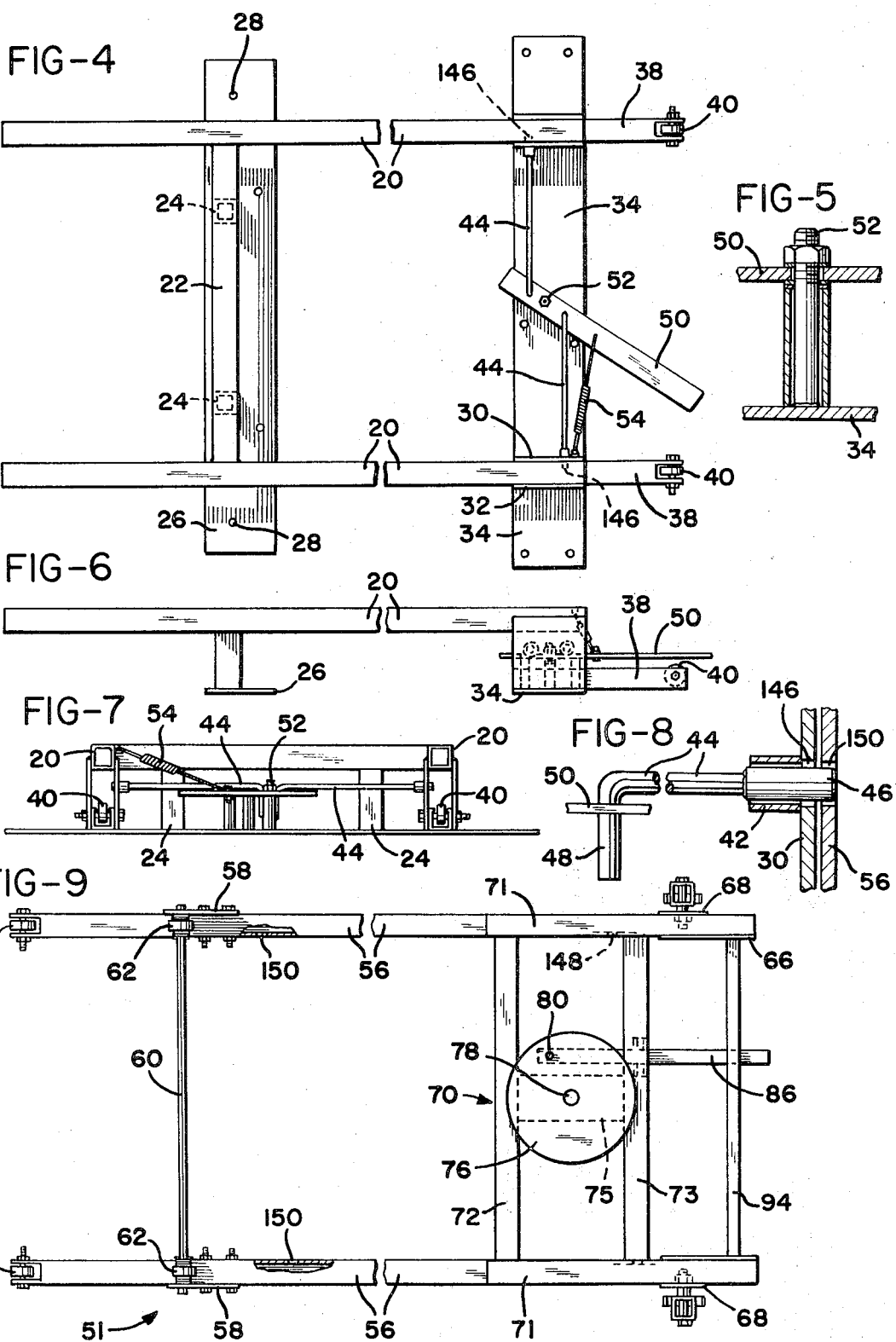

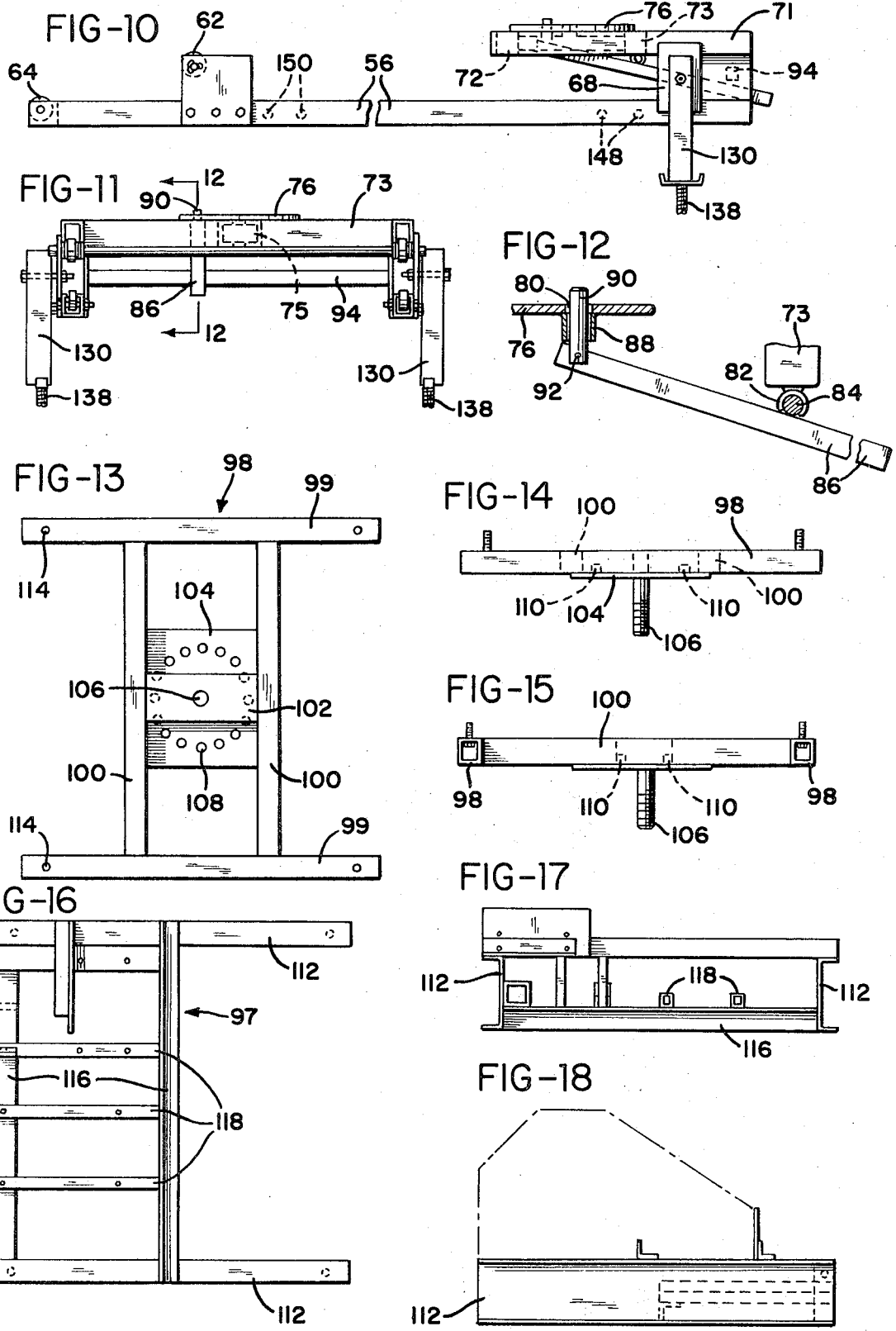

WINCH SYSTEM

BACKGROUND OF THE INVENTION

Several different methods are utilized for installing cable, such as coaxial cable, in an aerial cable system. U.S. Pat. Nos. 2,250,269; 3,070,324; 3,073,574 and 3,291,256 disclose various cable stringing systems and equipment used therewith.

In another method of stringing cable from an existing messenger strand, a series of cables to be installed are unwound from several cable reels and attached to a stringing puller which is mounted for movement along the messenger strand. Suitable cable supports are positioned along the messenger strand and a towing cable is attached at one end to the stringing puller and at its opposite end to a motor powered winch. Thus, as the towing cable is taken up on the motor driven winch the stringing puller is moved along the messenger strand, unreeling cable from the reels thereof and positioning them on temporary supports beneath the messenger.

SUMMARY OF THE INVENTION

The present invention provides a winch system adapted for stringing aerial cable in the manner described above. The system includes a motor vehicle having an enclosed compartment and a stationary track assembly mounted within the compartment on the floor thereof. Mounted on the stationary track assembly is a movable track assembly which carries at its outer end an indexing frame. The indexing frame rotatably mounts a base frame for a motor driven winch, which may be of conventional construction.

Additionally, the indexing frame is provided with means for locking the winch base frame against rotational movement in any one of several selected positions. The winch system in accordance with the present invention also includes locking means for locking the movable track assembly in either a stowed position within the vehicle compartment or in an active position with the outer end of the movable track assembly disposed outward of the compartment.

When the system is in its active position, stabilizing legs may be utilized, pivotally mounted to the movable track assembly adjacent the outer end thereof. The stabilizing legs may be provided with screwed threaded lower portions to permit vertical adjustment of the legs and stabilizing chains may also be attached to outer end of the movable track assembly, extending diagonally outwardly of the track assembly and forwardly to the vehicle for attachment thereto.

Thus the present invention provides a winch system in which all of the components may be stowed within the vehicle compartment for protection against the elements and for ease in transport but which may be quickly converted to an active configuration with the winch disposed outwardly of the compartment and positioned in any of several selected positions about a vertical axis, thus providing a means to orient direction of winch pull when the choice of placement of the vehicle is restricted by traffic, backyard easement, lawn, garden, or obstructions of any sort.

BRIEF DESCRIPTION OF THE DRAWINGS

FIG. 1 is a perspective view of the winch system of the present invention;

FIG. 2 is an enlarged view of the stabilizing chain attached to a portion of the vehicle;

FIG. 3 is an exploded perspective view of a portion of the winch system;

FIG. 4 is a plan view of the stationary track assembly thereof;

FIG. 5 is a view of a portion of the assembly of FIG. 4;

FIG. 6 is a side view of the assembly of FIG. 4;

FIG. 7 is an end view of the assembly of FIG. 4;

FIG. 8 is an enlarged view of a portion of the structure shown in FIG. 7;

FIG. 9 is a plan view of the movable track assembly of the present invention;

FIG. 10 is a side view thereof;

FIG. 11 is an end view thereof;

FIG. 12 is a view taken on line 12—12 of FIG. 11;

FIG. 13 is a view of a portion of the winch base frame;

FIG. 14 is a side view thereof;

FIG. 15 is an end view thereof;

FIG. 16 is a plan view of a portion of the winch base frame;

FIG. 17 is an end view thereof; and

FIG. 18 is a side view thereof.

DESCRIPTION OF THE PREFERRED EMBODIMENT

Referring initially to FIGS. 1 and 3 of the drawings, it will be seen that the system of the present invention includes a motor vehicle 10, including a compartment 12 having a floor portion 14 and a pair of doors 16. Mounted within the compartment 12 on the floor portion 14 is an upper stationary track assembly 18.

Track assembly 18 includes an opposed pair of box beams 20 interconnected adjacent their forward ends by a transverse box beam 22. Box beam 22 is provided with a pair of downwardly projecting legs 24 attached to a plate member 26 and beam 22 by welding or the like. plate member 26 is provided with openings 28 adjacent each of its ends, by means of which it may be bolted to the floor 14 of the vehicle 10.

Adjacent its rear end, as may also be seen in FIGS. 4, 6 and 7, the track assembly 18 is provided with downwardly projecting pairs of side plates 30 and 32. The side plates 30 and 32 are attached by welding or the like to a plate member 34 having openings 36 adjacent each of its ends by means of which plate 34 may also be bolted to the floor 14. The plates 30 and 32 also have attached therebetween short, rearwardly extending box beams 38 which carry rollers 40 rotatably mounted at the rear ends thereof.

Bushings 42 are attached by welding to the inner surface of the plates 30 in alignment with openings formed in the plates 30. Rods 44 have their enlarged ends 46 slidably received in the bushings 42 and have their opposite ends 48 bent downwardly, as best seen in FIG. 8 of the drawings. A lever 50 is pivotally mounted, as at 52 (FIG. 4), and the bent over ends 48 of the rods 44 are received through openings formed in lever 50 on opposite sides of the pivot point 52. A coil spring 54 is anchored at one end to a plate member 30 and at its opposite end to the lever 50, thus tending to pivot the member to the left, as in FIG. 3 of the drawings.

A movable track assembly 51 is formed, as best seen in FIGS. 9 through 11 of the drawings, with a pair of longitudinally extending box beams 56 having a pair of opposed plate members 58 projecting upwardly therefrom. A cross shaft 60 is mounted on the plates 58 and rotatably carries rollers 62 adjacent each end in rolling engagement with an upper surface of each of the box beams 20.

Adjacent their forward ends the beams 56 carry rollers 64 which engage a lower surface of each of the beams 20 while the rollers 40 engage a lower surface of each of the beams 56. Adjacent their rear ends each of the beams 56 carries upstanding plate members 66 and 68. Attached to the plate members 66 and 68 by welding or the like is an index frame 70.

Index frame 70 consists of a pair of longitudinally extending box beams 71 interconnected by cross beams 72 and 73, which in turn are braced by a rectangular box beam 75. A disk 76 is fixed to members 72, 73, 75 and has a centrally located opening 78 formed therein defining a socket. Additionally, an opening 80 formed through the disk 76 displaced radially outwardly from the opening 78.

A lower surface of the cross member 73 is provided with a pair of bearings 82 rotatably receiving a circular rod 84. The rod 84 is fixed by welding or the like to a lever 86 to provide a substantially horizontal pivot for the lever 86. A short length of pipe 88 is welded to the lower surface of the disk 76 in alignment with the opening 80, defining therewith a collar which slidably receives a stud 90 pivotally mounted, as at 92, at one end of the lever 86.

It will be seen, therefore, that pivotal movement of the lever 86 will cause the stud 90 to slide in the opening 80 and member 88, with complete retraction of the stud 90 from the member 88 being prevented by a cross member 94 which limits pivotal movement of the lever 86. Additionally, the rear end of the lever 86 will be suitably weighed to urge the stud 90 at all times to the position shown in FIG. 12 of the drawings.

A base frame 95 for a winch 96 includes upper and lower sections 97 and 98, respectively. Lower section 98 is formed of a pair of box beams 99 interconnected by cross members 100. A rectangular cross sectioned box beam 102 extends between the members 100 and is fixed thereto by welding or the like as best seen in FIGS. 3 and 13 through 15 of the drawings. A rectangular plate member 104 is welded to the lower surface of the box beams 100 and 102.

The plate member 104 is provided with a centrally located stub shaft 106 and a plurality of circularly arranged openings 108 displaced radially outwardly from the shaft 106 a distance equal to the displacement of opening 80 from opening 78 in disk 76. It will be necessary to notch the box beam 102, as at 110 to accommodate the openings 108 which intersect the walls of the box beam 102.

The upper section 97 of the base frame includes a pair of channels 112 bolted to the box beams 99 by means of bolts or the like 114. Channels 112 are provided with suitable cross braces, as at 116, and longitudinally extending members 118 which receive the drum 120, motor 122 and interconnecting gearing 124 of the winch 96. Winch 96 may be any suitable commercially available winch whether hand operated or powered electrically or by a gasoline engine. One suitable type is the Model 4C7 winch manufactured by Thern, Inc. Generally a winch of this type will be supplied by the manufacturer mounted on a suitable frame, such as the frame 97.

The base frame 95 for the winch 96 is assembled to the index frame 70 with the stub shaft 106 received in the socket 78 and retained therein by means of a nut 126. With the base and index frames thus assembled the stud 90 will be slidably received in the member 88, opening 80 and one of the openings 108, depending upon the angular position of the base frame with respect to the index frame.

At its outer, rearmost end, the movable track assembly is provided with a pair of stabilizing legs 128. Each leg 128 includes a box like portion 130 pivotally mounted, as at 132, to one of each of the box beams 56. A lower portion of each of the legs 128 is also box shaped and carries a pad 136 at its lower end for ground engagement. The lower portion 134 of the legs 128 may be in the form of a screw jack, including a screw threaded portion 138 which permits vertical adjustment of the legs 128.

Stabilizing chains 140 are attached to the outer, rearmost ends of the box beams 56 and are provided with snap hooks 140 on their opposite ends. The snap hooks may be snapped into rings 142 mounted on the vehicle bumper 144 when the winch system is in the active configuration shown in FIG. 1 of the drawings.

With the above construction, it will be seen that the lower, movable track assembly is movable along the upper stationary track assembly from a stowed position to an active position. In the stowed position the movable track assembly and the base and index frames, as well as the stationary track assembly, are completely received within the compartment 12. When moving the system to the stowed configuration, the chains 140 are unhooked from the rings 142, the legs 128 collapsed and pivoted alongside the box beams 56 and the entire assembly slid into the compartment 12.

When in the stowed configuration the ends 46 of the rods 44 extend through the bushings 42, openings 146 in the side plates 30 and openings 148 in the inner walls of the box beams 56 to lock the system in this configuration. Conversely, when the system is in the active configuration, the enlarged ends 46 of the rods 44 are received in the bushings 42, the openings 146 in the plates 30 and openings 150 in the inner walls of the box beams 56, thus locking the system in this configuration. Locking and unlocking of the track assembly is, of course, accomplished by merely pivoting the lever 50 against the tension of spring 54.

Additionally, the angular dispostion of the winch base frame 98 with respect to the index frame 70 is changed by pivoting the rear end of the lever 86 upwardly to retract the stud 90 from one of the openings 108, an then rotating the base frame to the desired position about its vertical axis until the stub 90 engages an opening 108 to lock the base frame in this position.

From the above, it will be seen that the present invention provides a winch system which may be completely received within the compartment of a vehicle for transport and yet is readily moved from a stowed to an active position with the movable components locked in their desired configuration.

While the form of apparatus herein described constitutes a preferred embodiment of the invention, it is to be understood that the invention is not limited to this precise form of apparatus, and that changes may be made therein without departing from the scope of the invention.

What is claimed is:

1. A self-contained winch system comprising:
   a. a vehicle having a floor portion,
   b. winch means and a base frame mounting said winch means thereon,
   c. an indexing frame,
   d. means rotatably mounting said base frame and winch means on said indexing frame for rotation about a substantially vertical axis, and
   e. track means interconnecting said vehicle floor portion and said indexing frame for sliding movement of said indexing frame between a stowed position overlying said vehicle floor portion and an operating position displaced outwardly from said stowed position.

2. The system of claim 1 further comprising:
   a. vertically adjustable leg means pivotally mounted on said track means adjacent an outer end thereof.

3. The system of claim 1 further comprising:
   a. stabilizing chain means extending from said track means to said vehicle.

4. The system of claim 1 further comprising:
   a. means for locking said indexing means in either said stowed or said active positions thereof.

5. The system of claim 4 wherein said track means includes stationary and movable track assemblies and said locking means comprises:
   a. a pair of outwardly projecting rod members mounted on the stationary track assembly for movement substantially transversely of said stationary track assembly,
   b. bushing means mounted on said stationary track assembly and slidably receiving outer ends of said rods, and
   c. means defining spaced openings along the movable track assembly alignable with said bushing means on said stationary track assembly when said movable track assembly is in either its stowed or active positions, and
   d. lever means for simultaneously moving said rods into and out of said openings in said movable track assembly.

6. The system of claim 1 wherein said track means comprises:
   a. a stationary track assembly mounted on said floor portion of said vehicle, and
   b. a movable track assembly slidable along said stationary track assembly and carrying said indexing frame adjacent an outer end thereof.

7. The system of claim 6 wherein:
   a. said vehicle includes a closed compartment,
   b. said floor portion is positioned within said compartment,
   c. said stationary track assembly is mounted on said floor portion within said compartment, and
   d. said movable track assembly is slidable along said stationary track assembly between said stowed position wherein said base frame mounting means is received within said compartment and said operating position wherein said base frame mounting means is disposed outwardly of said compartment.

8. The system of claim 1 wherein said means rotatably mounting said base frame and winch means on said indexing frame for rotation about a substantially vertical axis comprises:
   a. socket means mounted on one of said frames, and
   b. a stub shaft mounted on the other of said frames and rotatably received in said socket.

9. The system of claim 8 further comprising:
   a. means on said indexing frame for locking said base frame against said rotational movement.

10. A winch system comprising:
    a. a motor vehicle having an enclosed compartment including a floor portion,
    b. an upper, stationary track assembly mounted on said floor portion within said compartment,
    c. a lower movable, track assembly engaging said upper track assembly and movable therealong between a stowed position beneath said upper track assembly and within said compartment and an active position displaced from said stowed position outwardly of said compartment,
    d. means for locking said lower track assembly in either said stowed or said active positions,
    e. an indexing frame mounted on an outer end of said lower track assembly,
    f. means defining a socket on said indexing frame,
    g. a lever arm mounted on said indexing frame for pivoting movement about a substantially horizontal axis,
    h. a substantially vertically oriented stud pivotally attached to said lever and slidably received in a collar on said indexing frame displaced radially outwardly from said socket,
    i. a winch base frame,
    j. a winch mounted on said base frame,
    k. a stub shaft projecting substantially vertically downwardly from said base frame and rotatably received in said socket,
    l. means defining a plurality of stud receiving apertures disposed circumferentially about said stub shaft and displaced radially outwardly therefrom the same distance said stud is displaced from said socket,
    m. a pair of vertically adjustable stabilizing legs pivotally mounted on said outer end of said lower track assembly, and
    n. a pair of stabilizing chains attached to said outer end of said lower track assembly and a portion of said motor vehicle.

* * * * *